United States Patent [19]

Whidden

[11] 4,399,556

[45] Aug. 16, 1983

[54] DEVICE FOR LOCATING AUDIO SURVEILLANCE APPARATUS

[76] Inventor: Glenn H. Whidden, 13214 L'Enfant Dr., Fort Washington, Md. 20744

[21] Appl. No.: 357,614

[22] Filed: Mar. 12, 1982

[51] Int. Cl.[3] ...................... H04B 17/00; H04B 11/00

[52] U.S. Cl. ...................................... 455/67; 455/228; 367/2; 367/127

[58] Field of Search .......................... 455/67, 226–229; 367/2, 127; 343/6 R, 6.5 SS; 340/825.56

[56] References Cited

U.S. PATENT DOCUMENTS

| | | | |
|---|---|---|---|
| 3,473,127 | 10/1969 | Williams et al. | 455/228 |
| 3,939,420 | 2/1976 | Risberg et al. | 455/228 |
| 4,127,817 | 11/1978 | Bell, Jr. | 455/67 |
| 4,264,978 | 4/1981 | Whidden | 455/67 |
| 4,368,539 | 1/1983 | Whidden | 455/227 |

OTHER PUBLICATIONS

"Scanlock Mark VB", from Technical Services Agency Inc., 12/15/81.

*Primary Examiner*—Jin F. Ng

*Attorney, Agent, or Firm*—Cushman, Darby & Cushman

[57] ABSTRACT

A pulse generator is provided for transmitting individual acoustic pulses which can be sensed by an audio surveillance device and retransmitted as modulated electromagnetic information. Circuitry is associated with the pulse generator for controlling the time when a first acoustic pulse is generated relative to the detection of an unmodulated carrier frequency. This circuitry further provides for the generation of a second acoustic pulse in the event that a modulated carrier frequency is detected during the interval when it can be expected that the first pulse has resulted in modulation of the previously unmodulated carrier frequency. Means are included in the circuitry for comparing the respective periods between the times the first and second acoustic pulses are generated and when modulation on the carrier frequency occurs within the predetermined intervals following such pulse generations.

13 Claims, 3 Drawing Figures

RADIO SIGNAL
ACOUSTIC SIGNAL

TEST PULSE
TO COUNTER RESET
FROM OUTPUT 18
TO LATCHES 82 + 86
TO LATCHES 84 + 88
DELAY 100
DELAY 48
TO GATE 102
IN
RESET
'2'
FROM OUTPUT 16
FROM OUTPUT 18

DEVICE FOR LOCATING AUDIO SURVEILLANCE APPARATUS

BACKGROUND OF THE INVENTION

In U.S. Pat. No. 4,264,978 which issued on Apr. 28, 1981, apparatus is disclosed for locating the presence of an audio surveillance device, commonly referred to as a "bug." This apparatus includes a conventional scanner for detecting carrier (or sub-carrier) frequencies and sequentially locking onto these frequencies. When a frequency is detected which carries no modulation, a single acoustic pulse is generated by the apparatus, and the pulse is propagated through the air so as to be picked up and retransmitted as a modulated signal by the transmitter of any bug in the vicinity. If the frequency to which the scanner is then locked is that of the bug's transmitter, the surveillance apparatus demodulates the signal received by it to produce an electrical pulse. Circuitry is provided within the apparatus which effectively measures the time between the transmission of the acoustic pulse and its return in the form of an electromagnetic signal so as to produce an indication of the distance between the detection apparatus and the bug.

While the apparatus disclosed in the aforesaid patent is quite reliable, it is unable to automatically determine, prior to the transmission of an acoustic pulse, whether the scanner is locked onto the carrier frequency of a bug or that of some other transmitter which, at the time, does not happen to be producing a modulated output. This can create a problem, for if there is a bug present but the detecting apparatus is locked onto another unmodulated carrier frequency, the propagation of the acoustic pulse will be picked up by the surveillance device. If this occurs repeatedly, it is likely that the operator of the device will be aware that efforts are being made to detect its presence, and he then can frustrate such efforts by disabling the bug's transmitter. Furthermore, once the person operating the bug is aware that a search effort is under way, the party under surveillance is denied the advantage of being able to deliberately disseminate inaccurate information with the likelihood of it being considered reliable by the bug's operator.

SUMMARY OF THE INVENTION

Deficiencies of audio surveillance detecting apparatus of the type just described are virtually eliminated in accordance with the present invention. More particularly, the improved apparatus recognizes that nearly all carrier frequencies which are detected by a scanner are likely to be modulated within a finite time period. Accordingly, circuitry is provided to respond to the detection of a carrier frequency and to allow a predetermined period of time to expire before an acoustic signal can be propagated. If within this time period modulation on the carrier is detected, the scanner resumes its search for another unmodulated carrier.

The absence of a modulated signal being received during the predetermined period does not necessarily mean, however, that the scanner has locked onto the carrier of a nearby audio surveillance device. Therefore, the circuitry includes means actuated by the propagation of an acoustic pulse for preventing the passage of any demodulated signal to the device's alarm circuitry unless such signal is received within a time period generally corresponding to the length of time which would be required for the acoustic pulse to travel to the remotest point in the area being searched.

Since it also is possible that the scanner may be detecting a carrier frequency of a distant transmitter, and that during the predetermined interval after the acoustic pulse is generated the detected carrier may be modulated, the present circuitry prevents the apparatus from falsely responding to such a situation. More particularly, the circuitry includes means for storing a pulse count representative of the amount of time actually elapsing between the generation of the acoustic pulse and the detection of a modulating signal within the predetermined interval alloted for a signal to be received. The receipt of a signal within this period automatically triggers the generation of a second acoustic pulse to commence a further time interval and an additional counting sequence. If a modulating signal is detected within the predetermined interval allowed for return of an electromagnetic signal representative of the second acoustic pulse, the second pulse count is compared with the first one. A favorable comparison is virtually conclusive that a bug has been detected. Accordingly, a suitable alarm is actuated. Additionally, the pulse counts can be utilized to establish the distance to the detected transmitter in the same manner as disclosed in U.S. Pat. No. 4,264,978.

The invention will be described in further detail with respect to the accompanying drawings, wherein:

FIG. 1 is a block diagram illustrating the communication network within which the present invention operates; and FIGS. 2A and 2B are block diagrams which together illustrate the various components which comprise the invention.

DETAILED DESCRIPTION OF THE INVENTION

Figures 1, 2A:
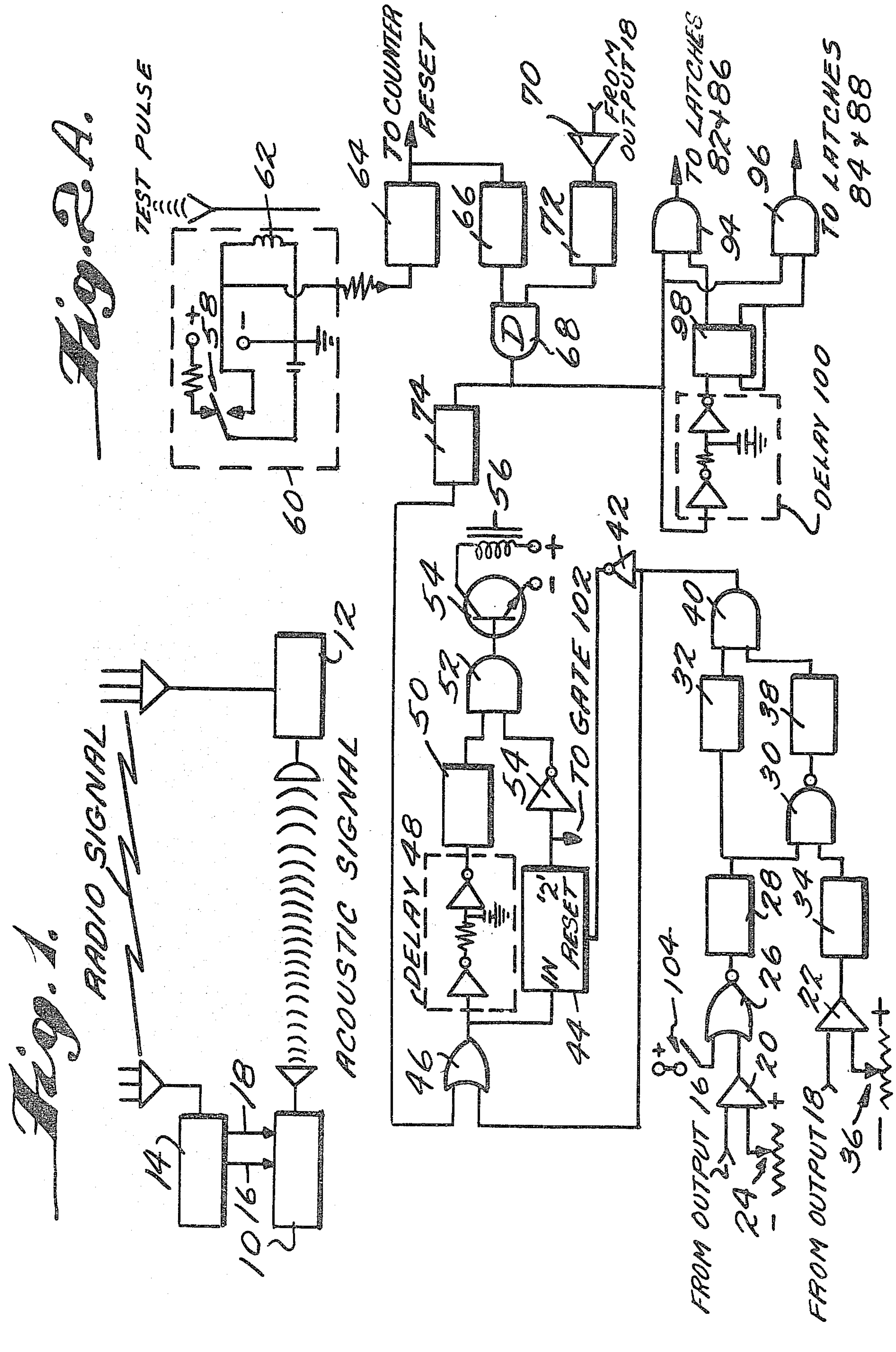

Referring first to FIG. 1 of the drawings, the circuit arrangement according to the invention, generally indicated by the numeral 10, generates individual acoustic pulses each of which is picked up by the transmitter portion 12 of a bug and is transmitted as a modulated electromagnetic signal. This signal is received and demodulated by a known bug detector 14, such as the SCANLOCK MARK V marketed by Technical Services Agency of Fort Washington, Md. Typically, this type of device performs a scanning function to detect the carrier (or sub-carrier) frequency of a transmitter, and after locking onto this frequency, it demodulates any signal carried thereby. The circuit arrangement 10 is connected to the detector 14 as an accessory whereby signals (such as an AVC signal) generated by detector 14 in response to a received carrier frequency, and demodulations of any information received with the carrier, are supplied respectively from outputs 16 and 18 of the detector 14 to the circuitry arrangement 10 which now will be described in detail with reference to FIGS. 2A and 2B.

The circuitry 10 comprises a pair of comparators 20 and 22 which are connected to detector outputs 16 and 18, respectively. If the signal supplied to comparator 20 in response to a detected carrier frequency exceeds a predetermined threshold level established by an adjustable threshold control 24, the comparator produces a logic HIGH output. This comparator output is applied to a NOR gate 26. The resultant logic LOW output from gate 26 is applied as an input to a one-shot multivibrator 28 having circuit parameters which cause the one-shot to produce a logic HIGH output for a period of two seconds. This two-second pulse is applied as inputs to a NAND gate 30 and a further one-shot multivibrator 32.

The application of the two-second HIGH pulse from one-shot 28 to the NAND gate 30 provides a reasonable time period for the circuitry to detect whether the carrier received by detector 14 is a modulated one. When the invention is being used to search a localized area for the presence of an audio surveillance device, the searcher can control the acoustic sound level in the room. Accordingly, if the room is maintained silent and modulation occurs within the two-second period, it is apparent that the detector has not locked onto the transmitter of a bug in the area being examined.

The manner in which the circuitry rejects modulation occurring in the two-second period involves the use of comparator 22 and a further one-shot multivibrator 34. When a signal representative of modulation is supplied to the input of comparator 22 by the output line 18 of detector 14, and when this signal exceeds a predetermined threshold level established by an adjustable control 36, comparator 22 produces a logic LOW output. This output is applied to one-shot 34 to produce a logic HIGH output which is connected to a second input of NAND gate 30. The presence of logic HIGHs at the inputs of gate 30 during the two-second interval produces a logic LOW from gate 30 which is applied to another one-shot multivibrator 38 to produce a two-second logic LOW output from the gate. This output is joined as an input to an AND gate 40. Whenever this input to gate 40 is LOW, the gate is inhibited to prevent a HIGH output therefrom.

The second input to gate 40 is the output of one-shot 32 which, at the end of the two-second interval, produces a brief pulse which is applied as a logic HIGH to gate 40. However, since the gate then is inhibited by the output from one-shot 38, no pulse is produced at the output of AND gate 40. Consequently, no acoustic test pulse is produced by the circuit, as would occur if there were no modulation received by circuit 10 during the two-second interval established by one-shot 28. The operation of circuit 10 under this condition now will be described.

When no modulation-produced signal is present at the input of comparator 22, its output is a logic HIGH. Consequently, the output of one-shot 34 is a logic LOW. The presence at the inputs of NAND gate 30 of this LOW and the two-second HIGH pulse from one-shot 28 produces a logic HIGH from gate 30, whereby the output of one-shot 38 remains at a logic HIGH to partially enable AND gate 40. Consequently, when at the end of the two-second pulse a logic HIGH pulse is produced by one-shot 32, the gate 40 is enabled to produce a triggering pulse. This pulse is directed to an inverter 42, the output of which is applied to the reset input of a decade counter 44 to reset the counter. Simultaneously, the output of gate 40 is passed by OR gate 46 so as to produce a logic HIGH output. The output of gate 46 is connected to the input of counter 44. The occurrence at substantially the same time of pulses at both the input and reset terminals of counter 44 normally results in the counter being reset rather than registering a count. However, if desired, the output of inverter 42 can be delayed briefly in order to negate any count which may occur as a result of a triggering pulse being generated at the output of AND gate 40.

The output of OR gate 46 also is passed through a conventional delay circuit 48 to the input of a further one-shot multivibrator 50 to produce a logic HIGH output pulse which is applied to AND gate 52. The other input of gate 52 is the "2" output of counter 44. Except when a count of "2" has been registered, this counter output is a logic LOW. Inverter 54 converts this LOW to a logic HIGh which is applied to the other input of AND gate 52 to partially enable the gate. Consequently, the presence of a HIGH output from one-shot 50 results in a logic HIGH output from gate 52 which is applied to the base of NPN transistor 54 causing it to conduct for a period established by one-shot 50. The collector circuit of the transistor includes a relay coil 56 which is operatively related to a switch 58 which constitutes a portion of a conventional pulse generating circuit 60 and which also includes a speaker coil 62. When transistor 54 conducts, the switch 58 reverses the state shown in FIG. 2A to cause current flow through coil 62 so as to produce a first acoustic test pulse which is propagated throughout the area being searched.

The operation of the pulse generating circuit 60, as just described, also produces a trigger pulse which is applied to a one-shot multivibrator 64 to produce a logic LOW pulse which, in turn, triggers a further one-shot multivibrator 66 to produce a logic HIGH pulse. The parameters of one-shot 66 are established to cause its output pulse to have a duration of approximately 45 milliseconds. This is roughly the time required for the acoustic test pulse to travel from one end of a 50-foot room to another, a distance which reasonably corresponds to the size of an area being searched for the presence of an audio surveillance device. Of course, the length of the pulse generated by one-shot 66 could be modified, if desired, to more nearly conform to a different size area of search.

The output of one-shot 66 is applied as one input to an AND gate 68. When this input is a HIGH during a period immediately following the generation of an acoustic test pulse, the gate is partially enabled.

The output line 18 from detector 14 also is joined to an amplifier 70 of circuit 10. The presence of a signal generated by detector 14 in response to modulation on the carrier being detected causes a further one-shot multivibrator 72 to produce a logic HIGH which is applied as a second input to AND gate 68. Consequently, if the gate 68 is partially enabled as a result of an acoustic test pulse having been generated, the occurrence of a HIGH output from one-shot 72 fully enables the gate to produce a logic HIGH output therefrom. This HIGH is directed to an additional one-shot multivibrator 74 to produce a logic HIGH triggering pulse which in turn is connected to a second input to OR gate 46. Thus, if, during the 45-millisecond period provided by one-shot 66, the acoustic test pulse is picked up by a transmitter within the area being searched and is retransmitted as an electromagnetic signal on the carrier to which the detector 14 is locked, the detector will produce a signal which will be processed by amplifier 70, one-shot 72, gate 68 and one-shot 74 to develop a further triggering pulse. This condition indicates, although not conclusively (as will hereinafter be explained), that an audio surveillance device is present. On the other hand, if no signal is applied to amplifier 70 during the 45-millisecond period established by one-shot 66, it can be concluded that there is no surveillance device within the area being searched which is operating on the carrier frequency to which the detector 14 then happens to be locked. Accordingly, the detector can then commence its scan for another carrier frequency.

To provide a means for discriminating between a situation where the apparatus has detected a bug and one where the detector 14 is locked onto a remote carrier which happened not to be modulated during the two-second period established by one-shot 28 but which was modulated during the 45-millisecond interval defined by one-shot 66, a second acoustic pulse is generated by circuit 60. This is accomplished by passing the aforesaid HIGH triggering pulse from one-shot 74 through OR gate 46. The output pulse from gate 46 both advances counter 44 to "1" and causes one-shot 50 to produce a HIGH output pulse. Since AND gate 52 is still partially enabled because the counter has not reached "2," the circuit 60 is operated in an identical fashion to that previously described, and a second acoustic pulse is generated.

Again, one-shots 64 and 66 operate as described above. In the event that a signal appears on the input of amplifier 70 within the new 45-millisecond interval established by one-shot 66, gate 68 and one-shot 74 produce a still further triggering pulse which is applied to OR gate 46. The output of gate 46 advances the counter to "2." Consequently, the output of inverter 54 is reversed and AND gate 52 is inhibited. To insure that the output of gate 46 does not arrive at the other input of gate 52 before it becomes inhibited, the delay circuit 48 is provided. By this technique, the generation of a third acoustic pulse is prevented.

Although the appearance of signals from output 18 of the detector within 45 milliseconds of both the first and second acoustic pulses strongly suggests the presence of an audio surveillance device within the area being examined, it still is possible that the modulation has occurred on a carrier associated with a remote transmitter onto which detector 14 is locked. Accordingly, the present invention provides means for excluding this possibility.

Figure 2B:
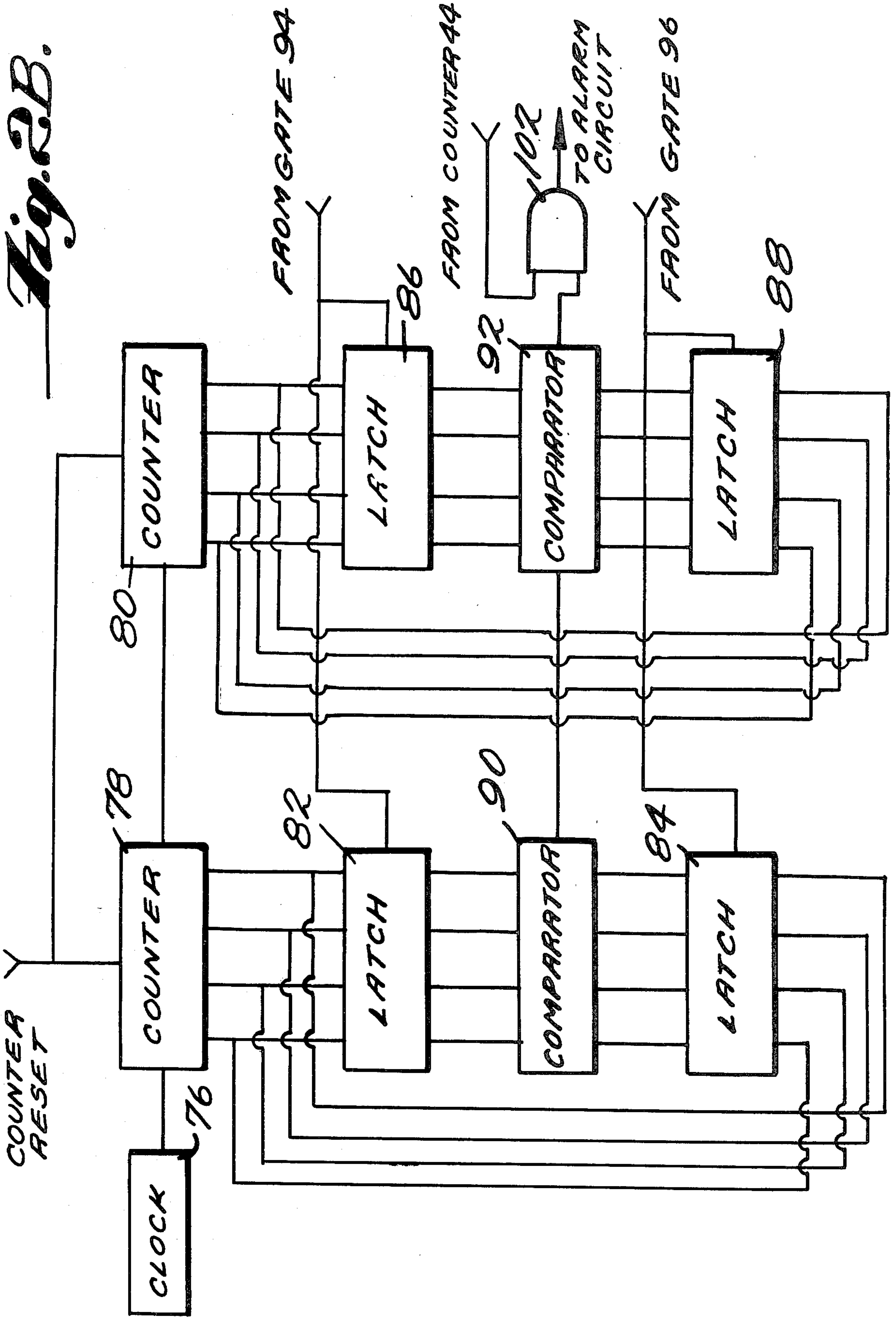

Referring to FIG. 2B, an arrangement is illustrated wherein a clock generator 76 is associated with a pair of interconnected 4-bit counters 78 and 80. Electrical pulses are produced by generator 76 at a rate of one pulse per 0.0009 second (i.e., about 1100 pulses per second). This number was selected since the speed of sound through the air is approximately 1100 feet per second, and the time for sound to travel one foot is approximately 0.0009 second. Accordingly, if the counter is started when an acoustic pulse is propagated from circuit 10 and is stopped when it returns in the form of a retransmitted electromagnetic signal which is picked up by detector 14, the pulse count obtained represents a readout in feet of the distance to the transmitter to which the detector 14 is locked.

A first pair of latches 82 and 84 are connected in parallel with the output terminals of counter 78. Similarly, latches 86 and 88 are joined to the output lines of counter 80. A first comparator 90 has its inputs connected to the outputs of latches 82 and 84, while a second comparator 92 is identically joined to latches 86 and 88. The comparators are interconnected and are joined to an alarm circuit for the purpose of indicating when an audio surveillance device has been detected.

The clock generator 76 is free running so as to continuously advance the counters 78 and 80. However, when an acoustic test pulse is generated, in the manner previously described, the counters are reset. This is accomplished by connecting the output pulse from one-shot 64 (FIG. 2A) to the reset inputs of the counters. When this occurs, the counters will immediately begin to count the pulse received from generator 76 commencing at zero. The counting will continue until AND gate 68 (FIG. 2A) is fully enabled by the receipt of a signal from one-shot 72 during the 45-millisecond period established by one-shot 66. The resultant pulse output from gate 68 is applied as a first input to each of a pair of AND gates 94 and 96. The second inputs to these gates are the respective outputs of a bistable multivibrator 98. The output of AND gate 68 also is passed through a delay circuit 100 to an input to multivibrator 98. The multivibrator is internally arranged such that each input pulse applied thereto reverses the states of its outputs.

On receipt of a first pulse from gate 68, one of the gates 94 and 96 is enabled to produce an output pulse which operates the pair of latches (82, 86 or 84, 88) associated with the enabled gate. As a result, the thus activated latches temporarily store the then existing count in the counters to which they are connected. Following an interval established by circuit 100, the output states of the bistable multivibrator 98 are reversed by the delayed input arriving at the multivibrator from gate 68. This prepares the circuitry for a further similar sequence.

When a second acoustic pulse is generated by circuit 60, the counters again are reset to zero. The development of another pulse at the output of gate 68 (indicating that modulating information has been detected within the second 45-millisecond interval established by one-shot 66) results in the other of the gates 94 and 96 being enabled to produce an output operating the other pair of latches to temporarily store the new count which has been obtained since the counters were reset.

Since the latches are connected to comparators 90 and 92, the presence of like counts in the respective pairs of latches produces a comparator output signal which is applied as one input to an AND gate 102 (FIG. 2B). The second input to gate 102 is the "2" output from decade counter 44 (FIG. 2A). When that counter has advanced to "2" as a result of two acoustic test pulses having been produced by the circuit 60, gate 102 is partially enabled. Consequently, when a comparison is detected by comparators 90 and 92, gate 102 is fully enabled to produce an output to an alarm circuit (not shown). This indicates to the operator that the circuit has performed two tests, each involving the propagation of an acoustic pulse, and it has found that a signal twice has been returned from a transmiterr located at a given distance from the detecting apparatus within an expected time period bearing a relationship to the size of the area being searched. Consequently, the circuit has determined with near certainty the presence of an audio surveillance device.

While the system described has operated automatically in response to an output 16 from detector 14, a test sequence also can be commenced manually by the closing of switch 104 shown in FIG. 2A.

What is claimed is:

1. A device for use in conjunction with a detector of covert audio surveillance apparatus of the type which senses information in the audio frequency range and which includes a transmitter for generating electromagnetic signals comprising a carrier frequency modulated by said information, said detector demodulating the electromagnetic signals to develop separate output signals representative of the carrier frequency and said modulating information, said device including:

means for producing discrete acoustic pulses and for propagating said pulses towards said transmitter portion;

means responsive to an input signal for initiating a first timing interval of predetermined duration;

means joined to said detector and to said timing interval initiating means for actuating said acoustic pulse producing means at the termination of said interval to produce and propagate a first acoustic pulse, said means preventing the actuation of the acoustic pulse producing means when an output signal representative of modulating information occurs during said interval;

means responsive to the actuation of said pulse producing means to initiate a second timing interval of predetermined duration;

means joined to said second timing interval initiating means and responsive to an output signal developed by the detector in response to receipt of modulating information during said second timing interval for actuating said acoustic pulse producing means to produce and propagate a second acoustic pulse;

a first means for measuring the time interval occurring between the actuation of said pulse producing means which produces and propagates said first acoustic pulse and the development of an output signal by the detector in response to receipt of modulating information during the second time interval initiated by such actuation;

a second means for measuring the time interval occurring between the actuation of said pulse producing means which produces and propagates said second acoustic pulse and the development of an output signal by the detector in response to receipt of modulating information during the second timing interval initiated by such further actuation;

means for comparing the time intervals measured by said first and second measuring means; and means joined to said comparing means for providing an alarm when the measured time intervals are equal.

2. A device as set forth in claim 1, wherein said input signal is manually produced in response to the actuation of a switch.

3. A device as set forth in claim 1, wherein said input signal is said output signal from the detector developed in response to the detection of a carrier frequency.

4. A device as set forth in claim 1, wherein said means for initiating a first timing interval includes a one-shot multivibrator.

5. A device as set forth in claim 4, wherein said means for actuating the acoustic pulse producing means to produce and propagate the first acoustic pulse includes gating means having connected as inputs thereto an output of said multivibrator and an output line from said detector upon which the demodulating information signal is developed.

6. A device as set forth in claim 1, wherein said means for initiating a second timing interval includes a one-shot multivibrator.

7. A device as set forth in claim 6, wherein said means for actuating the acoustic pulse producing means to produce and propagate the second acoustic pulse includes gating means having connected as inputs thereto an output of said multivibrator and an output line from said detector upon which the modulating information signal is developed.

8. A device as set forth in claim 1, further comprising a clock generator for producing a train of pulses, each of said means for measuring time intervals including a counter selectively joined to said generator for counting the number of pulses produced by the generator during the respective interval.

9. A device as set forth in claim 8, wherein said clock generator produces a train of pulses at a frequency corresponding to the speed of propagation of an acoustic signal.

10. A device as set forth in claim 8, wherein said comparing means comprises a comparator for comparing the number of pulses counted by the respective counters.

11. A device as set forth in claim 1, wherein:

said means for initiating a first timing interval includes a one-shot multivibrator, said means for actuating the acoustic pulse producing means to produce and propagate the first acoustic pulse including gating means having connected as inputs thereto an output of said multivibrator and an output line from said detector upon which the modulating information signal is developed; and said means for initiating a second timing interval includes a further one-shot multivibrator, said means for actuating the acoustic pulse producing means to produce and propagate the second acoustic pulse including gating means having connected as inputs thereto an output of said further multivibrator and said output line from the detector;

the device further comprising:

a clock generator for producing a train of pulses at a frequency corresponding to the speed of propgation of an acoustic signal, each of said means for measuring time intervals including a counter selectively joined to said generator for counting the number of pulses produced by the generator during the respective interval; and wherein said comparing means comprises a comparator for comparing the number of pulses counted by the respective counters.

12. A device as set forth in claim 11, wherein said input signal is manually produced in response to the actuation of a switch.

13. A device as set forth in claim 11, wherein said input signal is said output signal from the detector developed in response to the detection of a carrier frequency.

* * * * *